3,181,348
SEMIDIRECT OSCILLATIONAL VISCOMETRY
John A. Lewis, Summit, N.J., assignor to Bell Telephone
 Laboratories, Incorporated, New York, N.Y., a corporation of New York
Filed July 5, 1962, Ser. No. 207,728
5 Claims. (Cl. 73—54)

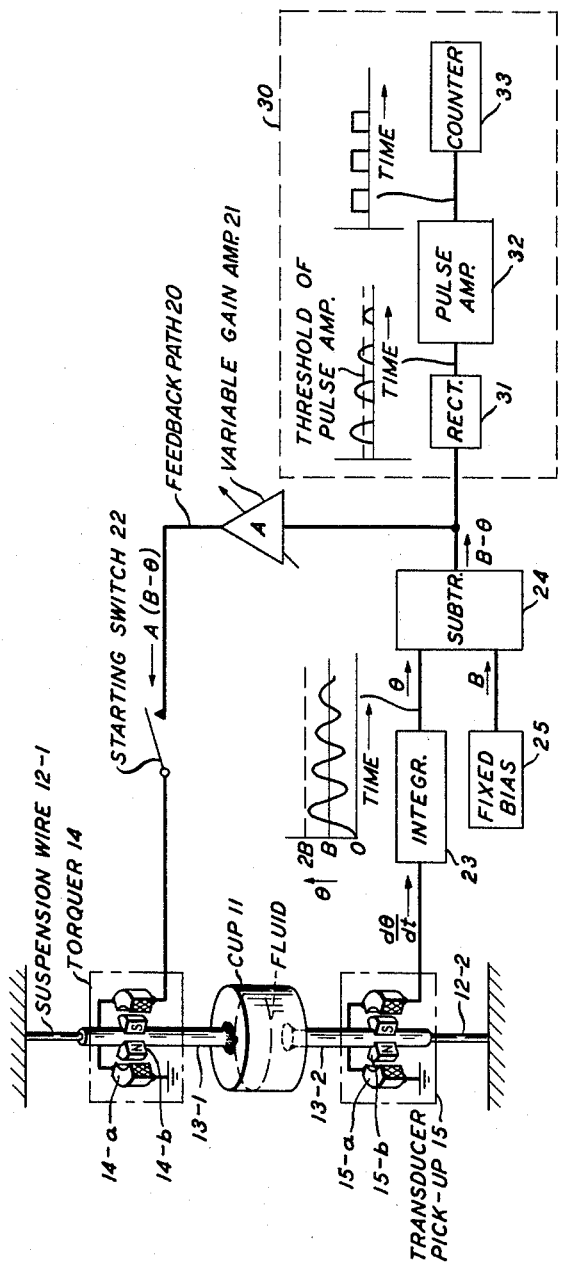

This invention relates to the determination of fluid viscosity, particularly by oscillational techniques.

The viscosity of a fluid is indicative of its resistance to flow. One measure of the resistance is provided by a viscometer in which a body containing the fluid, or immersed in it, is caused to undergo oscillations. Then, the viscosity is derivable from the measured drag of the fluid on the body. When the body undergoes free, as opposed to force, oscillations, the drag is indicated by the rate of decay, i.e., damping of the oscillations.

Unfortunately, known measures of viscosity, such as those obtained from oscillational viscometers, are somewhat indirect. Using those measures, the ultimate determination of viscosity requires calculations that involve difficult mathematical boundary problems. Further, although conventional viscometers can be calibrated with respect to reference fluids of known viscosity, their calibration curves also fail to follow simple mathematical patterns. As a result, construction of the curves requires a large number of calibration points, each based upon a different reference fluid. Also, the curves are of high accuracy only insofar as the measure of a test fluid lies in the vicinity of a calibration point.

Accordingly, it is an object of the invention to increase the directness with which viscosity can be measured. A related object is to eliminate the need for solving complex mathematical boundary value problems in order to arrive at an absolute measure of viscosity.

Another object of the invention is to facilitate the calibration of an oscillational viscometer. A coordinate object is to render an oscillational viscometer accurately calibrated throughout its entire range with respect to but a single reference fluid of known viscosity.

To accomplish the foregoing and related objects, the invention provides a semidirect measure of viscosity by varying the frequency of an oscillating body, containing a fluid under test, until the frequency of maximum damping is determined. The viscosity of the test fluid is directly proportional to the frequency thus determined, where the constant of proportionality is the ratio of known viscosity of a reference fluid to its frequency of maximum damping.

In a specific aspect of the invention the frequency is varied by the electrical equivalent of changing the spring constant associated with an oscillating cup containing the fluid under test. This is accomplished through the use of an amplifier linking input and output transducers for the cup. The frequency of maximum damping is indicated when the gain setting of the amplifier results in a minimum count of oscillatory cycles, above a threshold, at the output transducer. Then the viscosity of the test fluid is directly proportional to the square root of the gain setting, where the constant of proportionality is the ratio of the known viscosity of a reference fluid to the square root of its gain setting for maximum damping.

Other aspects of the invention will become apparent after considering an illustrative embodiment, taken in conjunction with the figure, which is a schematic diagram of an oscillational viscometer according to the invention.

Shown in the figure is an electromechanical system constituted of an oscillatable structure, including a cup 11 that holds a fluid under test, and an amplifier 21 whose gain setting controls the effective spring constant of the system. During the test, the gain setting, which may be greater or less than unity depending upon circumstances, is adjusted until an indicator 30 reads the maximum oscillatory decay in the system. The gain setting thus obtained provides a semidirect measure of the viscosity of the fluid under test.

The cup 11 is suspended by suspension wires 12–1 and 12–2 through rigid upper and lower shafts 13–1 and 13–2. Affixed to the shafts, which are connected to the cup, are input and output transducers 14 and 15 which provide the requisite electromechanical energy conversions for the system. The input transducer 14 is commonly known as a torquer. When current passes through its fixed field winding 14–a, a magnetic armature 14–b on the upper shaft is deflected in proportion to the strength of the current. Conversely, the output transducer 15, known as a pickup, generates a current in its fixed field winding 15–a, that is proportional to the rate of change of the deflection of its magnetic armature 15–b on the lower shaft. It is to be understood that the torquer and pickup shown in the figure are merely symbolic of appropriate electromechanical transducers.

Linking the two transducers is a feedback path 20 containing the amplifier 21 along with a starting switch 22, an integrator 23, and a subtractor 24. The latter subtracts a signal generated by the output transducer 15 from a starting signal generated by a fixed-bias source 25.

Besides being applied to the amplifier, the difference signal of the subtractor 24 is also applied to the indicator 30, which includes a rectifier 31, a threshold amplifier 32 and a counter 33. The maximum decrement is indicated when the count of the counter 33 is minimum.

To determine the viscosity of a fluid in accordance with the invention, a small quantity of the fluid is placed in the cup 11 of the oscillatable structure. For reasons explained shortly, the level of the fluid in the cup is not critical. When the starting switch is closed, a signal AB, established by the fixed bias level B of the source 25 and the gain A of the amplifier 21, is applied to the input transducer 14. This gives rise to a magnetic field in the fixed field winding, applying a torque to the armature and initiating rotation of the cup about its axis of suspension.

At the output transducer 15 the deflection $\theta$, associated with the rotation, appears as a signal that is proportional to its rate of change $$\frac{d\theta}{dt}$$

The transducer signal is converted into a signal proportional to the deflection $\theta$ by the integrator 23.

For rotational oscillations to take place, there must be a component of restoring torque proportional to the deflection and of opposite sign. This is the well known condition for simple harmonic motion. In the case of linear harmonic motion, such as that provided by a mass suspended from a spring connected to a fixed point, the force is commonly stated as being proportional to the displacement but opposite in sign. However, for the case of rotational motion, as exemplified by an oscillating pendulum or by the oscillating cup of the present invention, the force is replaced by torque, and the displacement is stated in terms of degrees of rotation. When the suspension wires 12–1 and 12–2 have spring constants of small magnitude, they produce a negligible component of restoring torque. Such is the case where the wires are long and, to eliminate transverse oscillations, are accompanied by centering bearings (not shown). On the other hand, an appreciable component of restoring torque is produced at the input transducer 14 by the action of the amplifier 21 upon the deflection signal. As a result, the factor of proportionality of the restoring torque, normalized with respect to the transducer, is substantially the gain A of the amplifier. Thus, the gain A is effectively the normalized spring constant of the system and determines the frequency of the oscillations, which vary as the gain varies. Of course, the suspension wires may have spring constants of appreciable magnitude. In that case the frequency of oscillations has a fixed component attributable to the suspension wires and a component that, as before, is determined by the gain of the amplifier.

Regardless of how the oscillations are produced, they decay exponentially, i.e., are damped, due to the resistance to rotation afforded by the fluid in the cup. A typical waveform for the damped oscillations is shown in the figure in the subgraph associated with the output of the integrator 23. After a short time, determined by the rate of damping, or decrement, the cup reaches its steady-state orientation governed by the fixed bias level B. Hence upon attainment of its steady state orientation the cup is deflected to an angular position determined by the fixed bias level, where it remains at rest until the initiation of an ensuing operating cycle.

The extent of damping is given by the decrement indicator 30. The deflection signal $\theta$, with the bias level B subtracted, is rectified to produce a sequence of diminishing amplitude pulses shown in the figure by the subgraph associated with the output of the rectifier 31. Those rectified pulses whose magnitudes exceed the threshold setting of the pulse amplifier 32, shown in the rectifier output subgraph, are reshaped by the amplifier into a limited sequence of equiamplitude pulse signals shown in the figure in the subgraph associated with the output of the amplifier. Finally, the equiamplitude pulse signals are counted by the counter 33 to provide a decrement indication. It is evident that the decrement increases as the count decreases and vice versa.

To determine the viscosity of a test fluid in keeping with the invention, the gain setting of maximum damping for a reference fluid of known viscosity $v_0$ is established initially. This involves a convergence procedure. First, the gain of the amplifier is adjusted until a small count is indicated by the counter. Then, the threshold level of the amplifier is reduced and the gain changed to again produce a small count. The convergence procedure is continued with the reference fluid until a gain $A_0$ is determined for the minimum threshold count of the counter. Next, the convergence procedure is repeated with the test fluid until a maximum decrement gain A is obtained. Then, the viscosity $v$ of the test fluid is given by Equation 1:

$$v = c_1 A^{\frac{1}{2}} \qquad (1)$$

where $c_1$ is a constant of proportionality given by $$\frac{v_0}{A_0^{\frac{1}{2}}}$$

for which $v_0$ and $A_0$ are respectively the viscosity and gain setting of maximum damping for the reference fluid.

It is to be noted that the viscosity of a test fluid determined in the foregoing way is subject to two qualifications. First, the viscosity is of the so-called kinematic variety which, nevertheless, is readily converted into ordinary viscosity by multiplying its magnitude by that of the test fluid density, as measured by well-known techniques. Second, kinematic viscosity determined by the technique of the invention applies, without correction, only to so-called Newtonian fluids, for which viscosity is independent of oscillational frequency.

An understanding of the relationship in Equation 1 between viscosity $v$ and the gain setting A of the amplifier is obtained by considering the decremental Equation 2 for the system of the figure.

$$D - D_0 = (I_t/I_c) f(wa^2/v) \qquad (2)$$

where

D is the logarithmic decrement of the cup containing the fluid, i.e., the natural logarithm of the ratio of the amplitude of vibration at any time to the amplitude one cycle later, $D_0$ is the decrement of the cup when empty, $I_t$ and $I_c$ are the moments of inertia of the fluid volume and the cup, respectively, $w$ is the natural frequency of oscillation of the cup, $a$ is a typical dimension of the fluid volume, $v$ is the kinematic viscosity of the fluid, and $f$ indicates "function."

As noted previously, viscosity is a measure of the drag of a fluid on the cup. When the fluid has zero viscosity, it remains stationary despite oscillations of the cup. As a result, there is no drag and the decrement D is zero. On the other hand, when the fluid has infinite viscosity, it cannot move relative to the cup. Again, there is no drag and the decrement D is zero. However, for any other viscosity, physical considerations dictate the existence of a drag. Because of the zero drag at the extremities of the viscosity scale and the existence of drag elsewhere, there is a viscosity where the drag is maximum. Thus, for a fixed inertial ratio $I_t/I_c$, the decremental difference $D-D_0$ in Equation 2 has a maximum for some value of the function variable $wa^2/v$.

If the natural frequency $w_0$ is known where the decremental difference is a maximum for a fluid of known viscosity $v_0$, and the maximizing natural frequency $w$ is determined for a fluid of unknown viscosity $v$ in the same cup, then the relation of Equation 3 applies.

$$\frac{wa^2}{v} = \frac{w_0 a^2}{v_0} \qquad (3)$$

or $$v = \left(\frac{v_0}{w_0}\right) w = c_2 w$$

where $c_2$ is the constant of proportionality $$\frac{v_0}{w_0}$$

Thus, the viscosity of a test fluid can be determined without knowing the functional form $f$, the inertial ratio $I_t/I_c$, the dimension $a$ of the cup, or the decremental difference $D-D_0$. While the moment of inertia of the fluid $I_t$ varies from fluid to fluid, since it depends on density, the variation affects only the magnitude of the decremental difference $D-D_0$ and not the location of its maximum. This follows from the linear relation between the decremental difference and the moment of inertia $I_t$. For the same reason, the amount of damping is not critical. It is only the frequency at which the damping is greatest that is of interest. However, for Equation 2 to be accurate, the moment of inertia of the fluid should be much smaller than that of the cup.

Equation 3 can be applied to determine the viscosity of a test fluid in a number of ways. One way is by using torsion wires having an appreciable spring constant and changing the lengths of the wires. In such a case, the amplifier is not used, and the spring constant $k$ of the torsion wire is inversely proportional to its length, so that the frequency of oscillation is given by Equation 4.

$$w = (k/I_c)^{\frac{1}{2}} = c_3/L^{\frac{1}{2}} \qquad (4)$$

where $c_3$ is a constant or, substituting into Equation 3

$$v = c_4 k^{\frac{1}{2}}$$

where $$c_4 = \frac{v_0}{k_0^{1/2}}$$

and $$v = \frac{c_5}{L^{1/2}}$$

where $c_5 = v_0 L_0^{\frac{1}{2}}$ and $L_0$ is the length maximizing the decrement for a fluid of known viscosity.

Where the amplifier is used, as in the figure, the gain setting A determines the spring constant $k$ in Equation 4, so that the frequency of oscillation is given by Equation 5.

$$w = (pA/1_c)^{1/2} \quad (5)$$

where $p$ is the proportionality factor introduced by the torquer, or $v = c_1 A^{1/2}$, as before.

Other adaptations and modifications of the invention will occur to those skilled in the art.

What is claimed is:

1. Apparatus for determining the viscosity of a fluid which comprises
a container for the fluid,
means for oscillating said container,
means for varying the oscillation frequency of said container,
and means for obtaining an indication of the oscillation frequency having the maximum rate of decay,
whereby the viscosity of said fluid is directly proportional to the oscillation frequency having said maximum rate of decay.

2. Apparatus for determining the viscosity of a fluid which comprises
a container for the fluid,
means for initiating oscillations of said container,
means for measuring the damping of said oscillations,
and means for varying the frequency of said oscillations until the measured damping is a maximum,
whereby the viscosity of said fluid is directly proportional to the maximally damped frequency.

3. Apparatus for determining the viscosity of a fluid which comprises
a system including a container for the fluid,
means for initiating oscillations of said container at a frequency determined by the spring constant of said system, said oscillations being damped by said fluid,
means for measuring the damping of said oscillations,
and means for varying the spring constant of said system,
whereby the viscosity of said fluid is directly proportional to the square root of the spring constant for which the oscillations are maximally damped.

4. Apparatus for determining the viscosity of a test fluid
which comprises
a container for the fluid,
means for supporting said container,
means for applying a torque to said supporting means, thereby to initiate oscillations of said container, which oscillations are damped by said fluid,
means for indicating the damping of said oscillations,
and means, responsive to said oscillations, for changing the torque applied to said supporting means and hence both the frequency and damping of said oscillations,
whereby the setting of said torque changing means, for which said damping is maximum, provides a measure of the viscosity.

5. Apparatus for determining the viscosity of a fluid which comprises
a vessel containing the fluid,
means for suspending said vessel,
input and output electromechanical transducers affixed to said vessel,
a feedback path including an amplifier and interconnecting the input transducer with the output transducer,
means, energizing said input transducer, for initiating oscillations of said vessel,
said oscillation being caused to decay in amplitude by the viscosity of said fluid and being of a frequency determined by the gain setting of said amplifier,
and means, responsive to said output transducer, for indicating the rate of decay of said oscillation,
whereby said gain setting for which said rate of decay is maximum is a measure of said viscosity.

References Cited by the Applicant

UNITED STATES PATENTS 2,550,052   4/51   Fay _____ 73—59

RICHARD C. QUEISSER, *Primary Examiner.*